US011882425B2

(12) United States Patent
Jang et al.

(10) Patent No.: US 11,882,425 B2
(45) Date of Patent: Jan. 23, 2024

(54) METHOD AND APPARATUS FOR RENDERING VOLUME SOUND SOURCE

(71) Applicant: ELECTRONICS AND TELECOMMUNICATIONS RESEARCH INSTITUTE, Daejeon (KR)

(72) Inventors: Dae Young Jang, Daejeon (KR); Kyeongok Kang, Daejeon (KR); Jae-hyoun Yoo, Daejeon (KR); Yong Ju Lee, Daejeon (KR); Tae Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 17/681,429

(22) Filed: Feb. 25, 2022

(65) Prior Publication Data

US 2022/0360932 A1 Nov. 10, 2022

(30) Foreign Application Priority Data

May 4, 2021 (KR) ........................ 10-2021-0057763

(51) Int. Cl.
*H04S 7/00* (2006.01)
*H04S 3/00* (2006.01)

(52) U.S. Cl.
CPC .............. *H04S 7/303* (2013.01); *H04S 3/008* (2013.01); *H04S 2400/01* (2013.01); *H04S 2400/03* (2013.01); *H04S 2400/13* (2013.01)

(58) Field of Classification Search
None
See application file for complete search history.

(56) References Cited

U.S. PATENT DOCUMENTS 8,494,666 B2 7/2013 Seo et al.
9,197,979 B2 11/2015 Lemieux et al.
9,942,687 B1 * 4/2018 Chemistruck ........... H04S 7/304
2013/0329922 A1 * 12/2013 Lemieux ................... H04S 7/30 381/307
2014/0126753 A1 * 5/2014 Takumai ................ H04S 7/305 381/303

(Continued)

FOREIGN PATENT DOCUMENTS

EP 2279618 B1 4/2014
WO WO2019067370 A1 4/2019

*Primary Examiner* — Qin Zhu

(57) ABSTRACT

A method and apparatus for rendering a volume sound source are disclosed. The method of rendering a volume sound source may include identifying information about a listener and information about the volume sound source, determining a corresponding area in which a source element is disposed in the volume sound source in consideration of the information about the listener, determining an angle between the listener and the corresponding area based on the information about the listener and the information about the volume sound source, determining a number of source elements disposed in the corresponding area according to the angle, determining a position and a gain of the source element using i) the number of source elements and ii) a distance between the listener and the volume sound source, and rendering the volume sound source according to the position and the gain of the source element.

17 Claims, 9 Drawing Sheets

(56) References Cited

U.S. PATENT DOCUMENTS

| | | | | |
|---|---|---|---|---|
| 2015/0264502 | A1* | 9/2015 | Aoki | H04S 5/005 381/17 |
| 2015/0334505 | A1* | 11/2015 | Crutchfield | H04S 7/30 381/17 |
| 2020/0128347 | A1* | 4/2020 | Schissler | H04S 3/008 |

* cited by examiner

METHOD AND APPARATUS FOR RENDERING VOLUME SOUND SOURCE

CROSS-REFERENCE TO RELATED APPLICATION

This application claims the benefit of Korean Patent Application No. 10-2021-0057763 filed on May 4, 2021, in the Korean Intellectual Property Office, the entire disclosure of which is incorporated herein by reference for all purposes.

BACKGROUND

1. Field of the Invention

One or more example embodiments relate to a method and apparatus for rendering a volume sound source, and more particularly, to a technology for efficiently rendering the volume sound source by determining the number of sound sources mapped to the volume sound source and a gain of each sound source, based on information about a listener.

2. Description of the Related Art

Recently, as the demand for VR technology and games increases, research on sound technology for reproducing realistic spatial sound is being actively conducted. An object-based sound signal for reproducing spatial sound views sound source as an object, and refers to a rendered sound signal in consideration of a relationship between a position of the object and a listener.

The object-based sound signal according to a related art processes the sound source as a point in space, but in the real environment, the sound source in the space may exist in various forms. For example, in a natural phenomenon, the sound of a fountain, waterfall, river, crashing waves, etc. may be generated in the whole of a certain area.

A sound source that generates sound in the whole of a certain area, such as a line, surface, or volume, is called a volume sound source. If the source element is arranged in all areas of the volume sound source, excessive calculation may be required in rendering the volume sound source, and if only one source element is arranged in the volume sound source, the sense of realism of the spatial sound may be insufficient. Accordingly, a technique for efficiently rendering the volume sound source is required.

SUMMARY

Example embodiments provide a method and apparatus for reproducing realistic spatial sound by rendering a volume sound source by determining the number of sound sources mapped to the volume sound source and a gain of each sound source based on information about a listener.

Example embodiments provide a rendering method and apparatus which may be applied to 6 degrees of freedom (6DOF) virtual reality in which a listener may freely move.

A method of rendering a volume sound source according to an example embodiment may include identifying information about a listener and information about the volume sound source, determining a corresponding area in which a source element is disposed in the volume sound source in consideration of the information about the listener, determining an angle between the listener and the corresponding area based on the information about the listener and the information about the volume sound source, determining the number of source elements disposed in the corresponding area according to the angle, determining a position and a gain of the source element using i) the number of source elements and ii) a distance between the listener and the volume sound source, and rendering the volume sound source according to the position and the gain of the source element.

The rendering method may further include determining the maximum number of the source elements based on the information about the volume sound source.

Determining the maximum number of the source elements may include determining the maximum number of the source elements and a sound source location in which the source elements may be disposed in the volume sound source using a size and shape of the volume sound source.

The information about the listener may include at least one of the position and a direction of the listener.

The information about the volume sound source may include at least one of a location, a size, and a shape of the volume sound source.

The rendering method may further include identifying a sound signal of the volume sound source and mixing (channel number conversion) the sound signal if the number of channels of the sound signal is different from the determined number.

The mixing (channel number conversion) the sound signal may include up-mixing the sound signal if the determined number is greater than that of the channels of the sound signal.

The mixing (channel number conversion) the sound signal may include down-mixing the sound signal if the determined number is smaller than that of the channels of the sound signal.

The rendering method may further include determining a contour of the corresponding area, wherein determining the angle may include determining an angle between the listener and the corresponding area, taking into account the contour of the corresponding area and the position of the listener.

Determining the corresponding area may include determining the corresponding area according to a boundary contacting to the position of the listener.

A rendering apparatus of the volume sound source according to an embodiment may include a processor, wherein the processor may identify information about a listener and information about the volume sound source, determine a corresponding area in which a source element is disposed in the volume sound source in consideration of the information about the listener, determine an angle between the listener and the corresponding area in consideration of the information about the listener and the information about the volume sound source, determine the number of the source elements disposed in the corresponding area according to the angle, determine a position and a gain of the source element using i) the number of the source elements and ii) a distance between the listener and the volume sound source, and render the volume sound source according to the position and the gain of the source element.

The processor may determine the maximum number of the source elements based on the information about the volume sound source.

The processor may determine the maximum number of the source elements and a sound source location in which the source elements may be disposed in the volume sound source using a size and shape of the volume sound source.

The information about the listener may include at least one of a location and a direction of the listener.

The information on the volume sound source may include at least one of a location, a size, and a shape of the volume sound source.

The processor may identify a sound signal of the volume sound source and mix (channel number conversion) the sound signal if the channel of the sound signal and the determined number are different.

The processor may up-mix the sound signal if the determined number is greater than that of the channels of the sound signal.

The processor may down-mix the sound signal if the determined number is smaller than that of the channels of the sound signal.

The processor may determine the contour of the correspondence area, and determine an angle between the listener and the correspondence area in consideration of the contour of the correspondence area and the position of the listener.

The processor may determine the corresponding area according to a boundary contacting to the position of the listener.

Additional aspects of example embodiments will be set forth in part in the description which follows and, in part, will be apparent from the description, or may be learned by practice of the disclosure.

According to example embodiments, realistic spatial sound may be reproduced by rendering a volume sound source by determining the number of sound sources mapped to the volume sound source and a gain of each sound source based on information about a listener.

According to example embodiments, a rendering method and apparatus may be provided, which may be applied to 6DOF virtual reality in which a listener may freely move.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
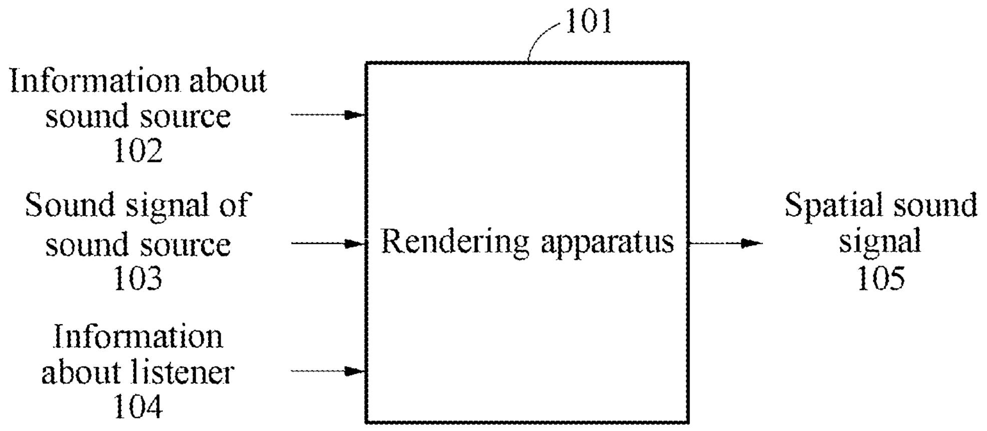
FIG. 1 is a diagram illustrating a rendering apparatus according to an example embodiment.

Hereinafter, example embodiments will be described in detail with reference to the accompanying drawings. However, since various changes may be made to the example embodiments, the scope of the patent application is not limited or restricted by these example embodiments. It should be understood that all modifications, equivalents and substitutes for the example embodiments are included in the scope of the rights.

The terms used in the example embodiments are used for the purpose of description only, and should not be construed as limiting. The singular expression includes the plural expression unless the context clearly dictates otherwise. In this specification, terms such as "include" or "have" are intended to designate that a feature, number, operation, operation, component, part, or a combination thereof described in the specification exists, but one or more other features it should be understood that this does not preclude the existence or addition of numbers, operations, operations, components, parts, or combinations thereof.

Unless otherwise defined, all terms used herein, including technical or scientific terms, have the same meaning as commonly understood by one of ordinary skill in the art to which the example embodiment belongs. Terms such as those defined in commonly used dictionaries should be interpreted as having a meaning consistent with the meaning in the context of the related art, and should not be interpreted in an ideal or excessively formal meaning unless explicitly defined in the present application.

In addition, in the description with reference to the accompanying drawings, the same components are given the same reference numerals regardless of the description numerals, and the overlapping description thereof will be omitted. In describing the example embodiment, the detailed description thereof will be omitted if it is determined that a detailed description of a related known technology may unnecessarily obscure the gist of the embodiment.

FIG. 1 is a diagram illustrating a rendering apparatus according to an example embodiment.

The example embodiment relates to a technology for rendering a volume sound source, it is possible to efficiently render the volume sound source by determining the number of sound sources mapped to the volume sound source and a gain of each sound source based on information about a listener 104 and information about the volume sound source 102.

A volume sound source is an object having a predetermined shape such as a line, a surface, and a volume, and a sound signal 103 may be generated from all the outer surfaces of the volume sound source, but in the example embodiment, it is possible to efficiently render the volume sound source by arranging only a part of source elements in consideration of an angle with the listener.

Referring to FIG. 1, the rendering apparatus 101 of the example embodiment may generate spatial sound signals 105, by rendering the volume sound source using information about the volume sound source 102, the sound signal of the volume sound source 103 and the information about the listener 104. The rendering apparatus 101 may include a processor. The processor included in the rendering apparatus 101 may perform the rendering method of the volume sound source according to various example embodiments.

The information about the listener 104 may include at least one of a position and a direction of the listener. The position or direction of the listener may be changed over time, and according to an example embodiment, the volume sound source may be rendered in consideration of movement or direction change of the listener in real time.

The position of the listener may be expressed as coordinates (for example, Cartesian coordinates) in a three-dimensional space. For example, the position of the listener may mean the position of the listener's head. The listener's position may be measured by an acceleration sensor, a depth sensor, etc. used in an applied virtual reality application.

For example, the direction of the listener may mean the direction of the head. It may be expressed as an angle in a spherical coordinate system or Euler angles, such as pitch, roll and yaw, centered on the listener's head.

The sound signal of the volume sound source 103 may be an object-based sound signal, a channel-based sound signal or an scene-based (Ambisonic) sound signal. The type of the sound signal 103 may not be limited to the described example. In the example embodiment, the sound signal of the volume sound source 103 may be generated in advance.

If the sound signal of the volume sound source 103 is the object-based sound signal, it is possible to be rendered based on the metadata for the source element determined according to an example embodiment. If the sound signal of the volume sound source 103 is the channel-based sound signal, it is possible to be rendered by mapping the source element determined according to an example embodiment to a predetermined disposition based on the number of channels.

If the sound signal of the volume sound source 103 is the scene-based sound signal, it is possible to be rendered by converting the source elements determined according to an example embodiment to the source elements which are disposed in an equivalent spatial domain (ESD) on a spherical surface.

The information about the volume sound source 102 may include at least one of a location, a size and a shape of the volume sound source. The shape of the volume sound source may mean a geometric shape. As an example, the volume sound source may have one of the various shapes such as a line, a surface, a sphere, a hexahedron, a tetrahedron, etc., and is not limited to the described or illustrated example. As an example, the volume sound source may be implemented as a set of points or a group of a plurality of triangular meshes.

A detailed method of efficiently rendering the volume sound source by determining the number of sound sources mapped to the volume sound source and the gain of each sound source based on the information about the listener 104 and the information about the volume sound source 102 will be described later in FIG. 2.

Figure 2:
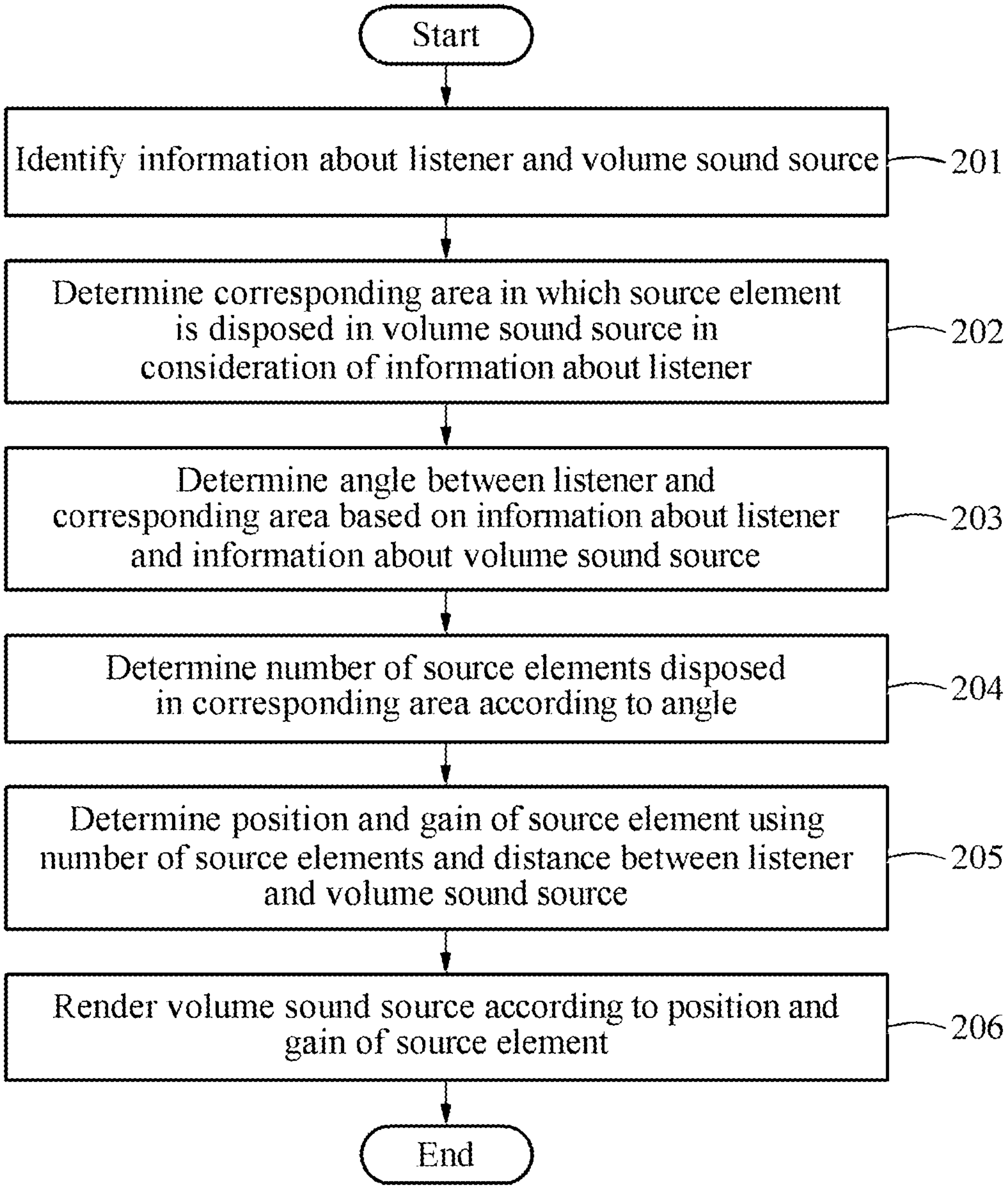
FIG. 2 is a flowchart illustrating a method of rendering a volume sound source according to an example embodiment.

FIG. 2 is a flowchart illustrating a method of rendering the volume sound source according to an example embodiment.

In operation 201, the rendering apparatus may identify information about the listener, information about the volume sound source, and the sound signal of the volume sound source. The information about the volume sound source may include at least one of a location, a size and a shape of the volume sound source. The information about the listener may include at least one of a location and a direction of the listener.

The rendering apparatus may determine the maximum number of source elements based on the information about the volume sound source. Specifically, the rendering apparatus may determine the maximum number of source elements and the sound source location in which the source elements may be disposed in the volume sound source, based on the size and shape of the volume sound source. The rendering apparatus may determine in advance the maximum number of sound source signals corresponding to the width of the sound source when the listener approaches the volume sound source. For example, the maximum number may be determined based on the disposition of two source elements when the angle formed by the volume sound source with respect to the listener is 60 degrees as a reference.

In operation 202, the rendering apparatus may determine a corresponding area in which a source element is disposed in the volume sound source in consideration of the information about the listener.

The corresponding area of the volume sound source may be determined according to a boundary contacting the listener's position. In other words, the corresponding area may be an area made up of points that meet a straight line passing through the listener's position among points forming the surface of the volume sound source.

In operation 203, the rendering apparatus may determine an angle between the listener and the corresponding area based on the information about the listener and the information about the volume sound source.

The rendering apparatus may determine the angle between the listener and the corresponding area by considering the contour of the corresponding region and the position of the listener. For example, the angle between the listener and the corresponding area may mean the largest angle among angles between the boundary of the corresponding area and the position of the listener.

In operation 204, the rendering device may determine the number of source elements disposed in the corresponding area according to the angle. As the angle between the listener and the corresponding area decreases, the number of source elements may be determined to be smaller. As the angle between the listener and the corresponding area increases, the number of source elements may be determined to be bigger. The number of source elements may be set not to exceed a predetermined maximum number for the volume sound source.

If the number of channels of the sound signal is different from the determined number, the rendering apparatus may mix the sound signal. For example, if the determined number is greater than that of the channels of the sound signal, the rendering apparatus may up-mix the sound signal according to the determined number. If the determined number is smaller than that of the channels of the sound signal, the rendering apparatus may map the sound signal to the source element by down-mixing the sound signal according to the determined number.

In operation 205, the rendering apparatus may determine the position and the gain of the source element using the number of source elements and ii) the distance between the listener and the volume sound source. For example, the rendering apparatus may divide the corresponding area by the number of source elements, and determine the positions of the source elements at arbitrary positions in each divided area.

For example, the rendering apparatus may divide the corresponding area into areas of the same size according to the number of source elements, and determine the center point of each divided area as the location of the source element.

The distance between the listener and the volume sound source may mean the distance between the listener and the corresponding area. The rendering apparatus may determine the gain of the source element according to the distance between the listener and the volume sound source. For example, the rendering apparatus may determine the gain of each source element with the same weight.

The rendering apparatus may determine the gain of the source element to be smaller as the distance between the listener and the volume sound source increases. The rendering apparatus may determine the gain of the source element to be larger as the distance between the listener and the volume sound source decreases.

However, if the distance between the listener and the volume sound source is included in a section in which the number of source elements is changed, the rendering apparatus may reduce noise by adjusting the gain of the source elements.

The section in which the number of source elements is changed may mean a section including a point at which the source element is changed according to the angle between the listener and the corresponding area. A section in which the number of source elements is changed may be determined to be smaller than a reference distance. In operation 206, the rendering apparatus may render the volume sound source according to the position and the gain of the source element.

Figure 3:
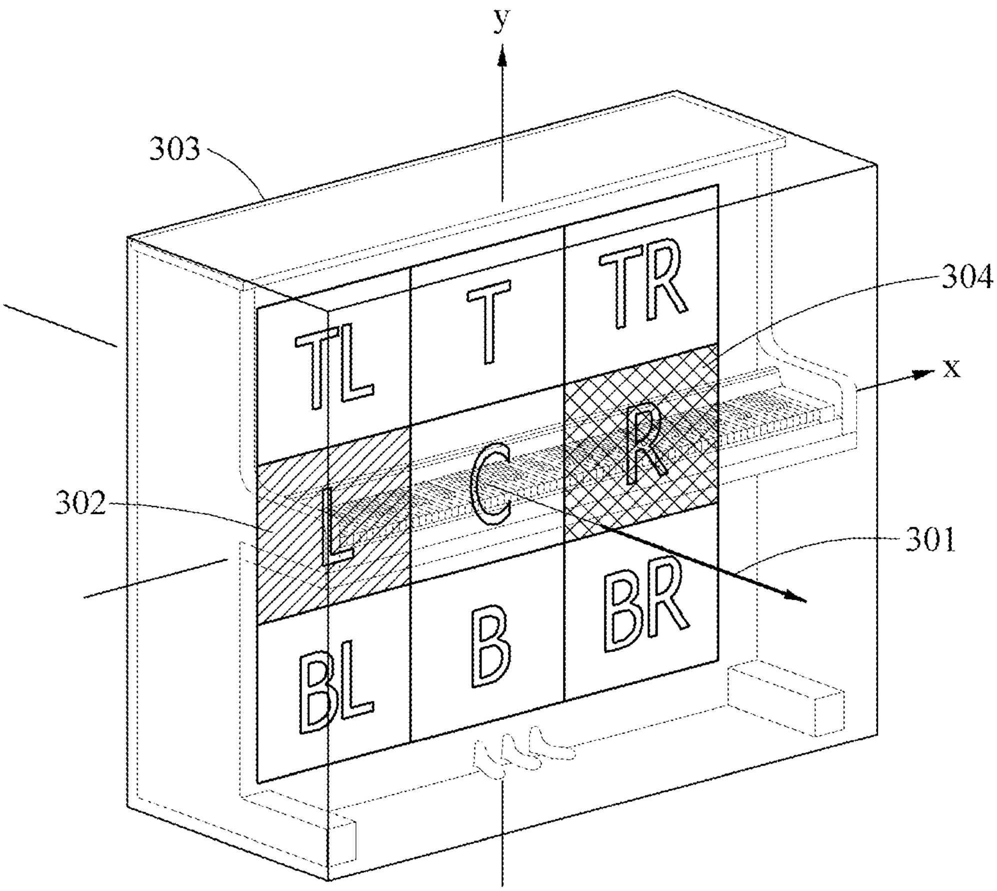
FIG. 3 is a diagram illustrating an example of a volume sound source providing a nine-channel sound signal according to an example embodiment.

FIG. 3 is a diagram illustrating an example of the volume sound source providing a two-channel sound signal according to an example embodiment.

The volume sound source 303 shown in FIG. 3 may be a piano. Referring to FIG. 3, an area including top-left (TL), top (T), top-right (TR), left (L), center (C), right (R), bottom-left (BL), bottom (B), and bottom-right (BR) areas may be a corresponding area of the volume sound source 303.

In FIG. 3, if the number of the channel of the sound signal (for example, piano sound) generated from the volume sound source 303 is two (2), since the sound is generated from the keyboard part in the piano, the rendering apparatus may dispose the source element at the L area 302 and the R area 304, and render the volume sound source 303 based on the positions of the disposed source elements.

According to an example embodiment, the number and position of the source elements are determined in consideration of the positional relationship between the listener and the volume sound source 303, rather than determining the source element according to the channel of the sound signal, and the volume sound source 303 may be rendered by mixing the sound signal accordingly.

For example, the position of the source element may be determined differently in real time by considering the position of the listener and the distance and angle of the listener, rather than simply determining the source element based on the front surface 301 of the volume sound source 303.

Figure 4:
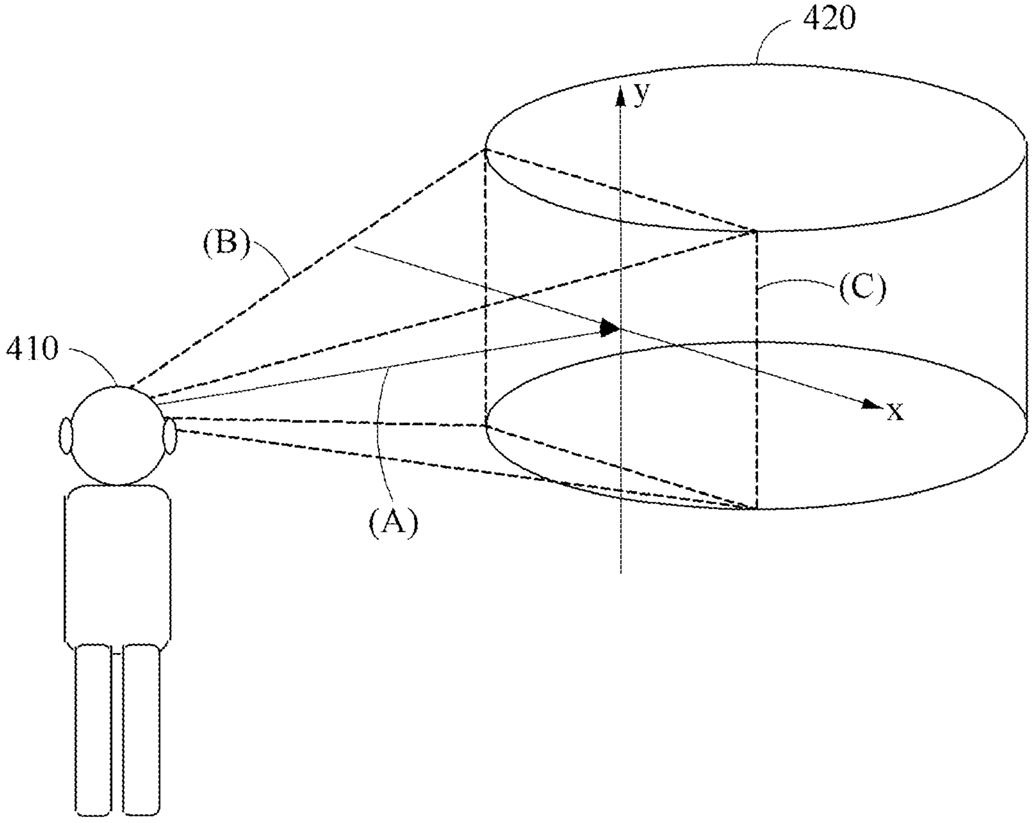
FIG. 4 is a diagram illustrating a positional relationship between a listener and a volume sound source according to an example embodiment.

FIG. 4 is a diagram illustrating a positional relationship between the listener and the volume sound source according to an example embodiment.

The position of the listener 410 may be determined based on the position of the head of the listener 410. The corresponding area of the volume sound source 420 (for example, (C) of FIG. 4) may be determined according to a boundary contacting the position of the listener 410. In other words, the corresponding area may be an area formed by points meeting a straight line passing through the position of the listener 410 among points forming the surface of the volume sound source 420. For example, the boundary of the volume sound source 420 according to the Elevation-Azimuth angle sector (for example, (B) of FIG. 4) at the position of the listener 410 may be determined as the corresponding area.

The positional relationship between the listener 410 and the volume sound source 420 may include a distance between the position of the listener 410 and the volume sound source 420, and the angle between the position of the listener 410 and the corresponding area. The distance between the position of the listener 410 and the volume sound source 420 (for example, (A) of FIG. 4) may mean the shortest distance of the corresponding area from the position of the listener 410.

The distance between the position of the listener 410 and the volume sound source 420 may mean the distance between the listener 410 and a point closest to the position of the listener 410 among points forming the surface of the volume sound source 420.

In FIG. 4, the volume sound source 420 may have a cylindrical shape. Referring to FIG. 4, the corresponding area of the volume sound source 420 may have a curvature. According to an example embodiment, rendering of the volume sound source 420 may be performed in consideration of the curvature of the volume sound source 420.

Figure 5:
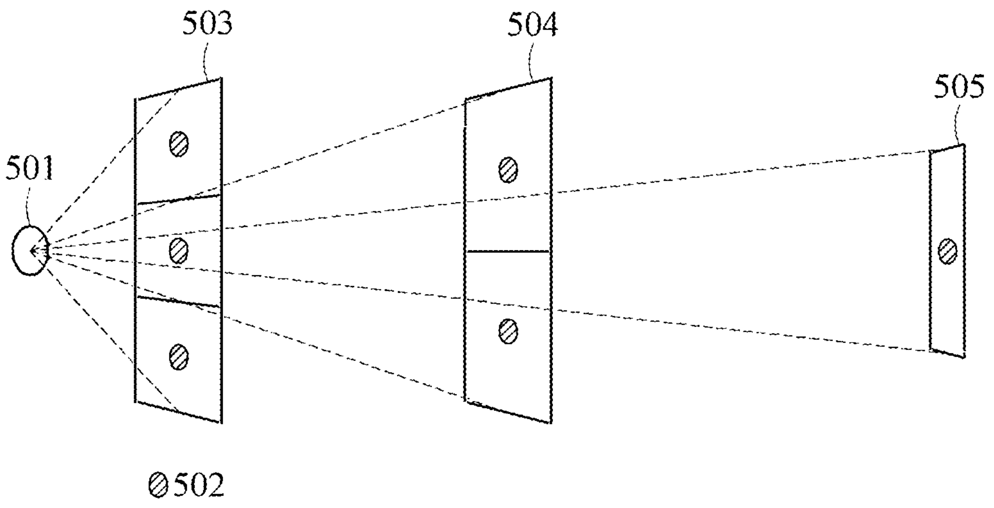
FIG. 5 is a diagram illustrating an example in which the number of sound sources is determined differently according to a distance between a listener and a volume sound source according to an example embodiment.

FIG. 5 is a diagram illustrating an example in which the number of sound sources is determined differently according to the distance between the listener and the volume sound source according to an example embodiment.

FIG. 5 is a diagram illustrating an example in which the number of source elements 502 is determined differently according to the angle between the listener 501 and the corresponding area. For example, the angle between the listener 501 and the corresponding area may mean the largest angle among angles between the boundary of the corresponding area and the position of the listener 501.

Referring to FIG. 5, as the angle between the listener 501 and the corresponding area decreases, the number of source elements 502 may be determined to be smaller. Referring to FIG. 5, as the angle between the listener 501 and the corresponding area increases, the number of source elements 502 may be determined to be bigger.

For example, in FIG. 5, three source elements 502 may be disposed in the corresponding area 503 having the largest angle with the listener 501. In this case, the number of source elements 502 may be set not to exceed a predetermined maximum number for the volume sound source.

As an example, in FIG. 5, two source elements 502 may be disposed in the corresponding area 504. For example, in FIG. 5, one source element 502 may be disposed in the corresponding area 505 having the smallest angle with the listener 501.

As an example, the number of source elements 502 may be preset according to an angular section. The number of source elements 502 may be predetermined for each N angular section. For example, if the angle is 10 degrees or less, one source element 502 may be disposed, if it is greater than 10 degrees and less than or equal to 60 degrees, two source elements 502 may be disposed, and if it is greater than 60 degrees, three source elements 502 may be disposed.

Figure 6:
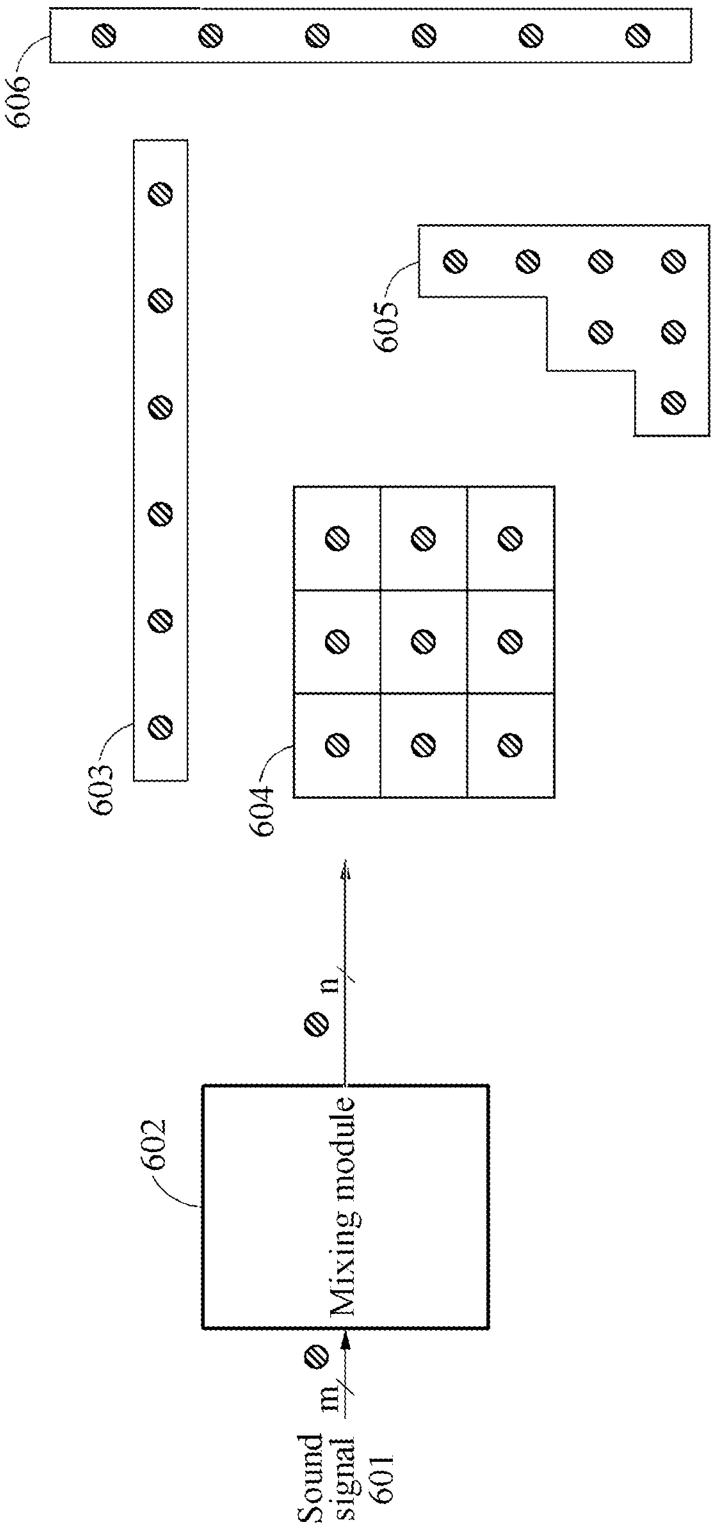
FIG. 6 is a diagram illustrating a case in which the number of channels of a sound signal and the number of sound sources required are different according to an example embodiment.

FIG. 6 is a diagram illustrating a case in which the number of channels of the sound signal is different from the number of sound sources required according to an example embodiment.

FIG. 6 is a diagram illustrating corresponding areas of a plurality of volume sound sources 603-606 and source elements disposed in the corresponding areas. For example, if it is determined that the number of channels of the sound signal 601 of the volume sound source 603-606 is m, and the number of source elements disposed in the corresponding area of the volume sound source 603-606 is n which is different from m, the rendering apparatus may change the number of channels of the sound signal 601.

If the number of channels of the sound signal 601 is different from the determined number, a mixing module 602 of the rendering apparatus may mix the sound signal 601. The mixing module 602 may correspond to a processor of the rendering apparatus.

For example, if the determined number is greater than that of the channel of the sound signal 601, the rendering apparatus may up-mix the sound signal 601. If the determined number is smaller than that of the channel of the sound signal 601, the rendering apparatus may down-mix the sound signal 601 and map it to the source element.

As an example, a weighted average using panning may be used for down-mixing. Alternatively, down-mixing may be implemented in a manner of excluding some channels from the plurality of channels. Up-mixing may be implemented using sound source separation or decorrelation. As an example, decorrelation may be achieved by a method such as a phase change, a frequency selective mask, a full band filter, and a delay of 30 msec or less.

Figure 7:
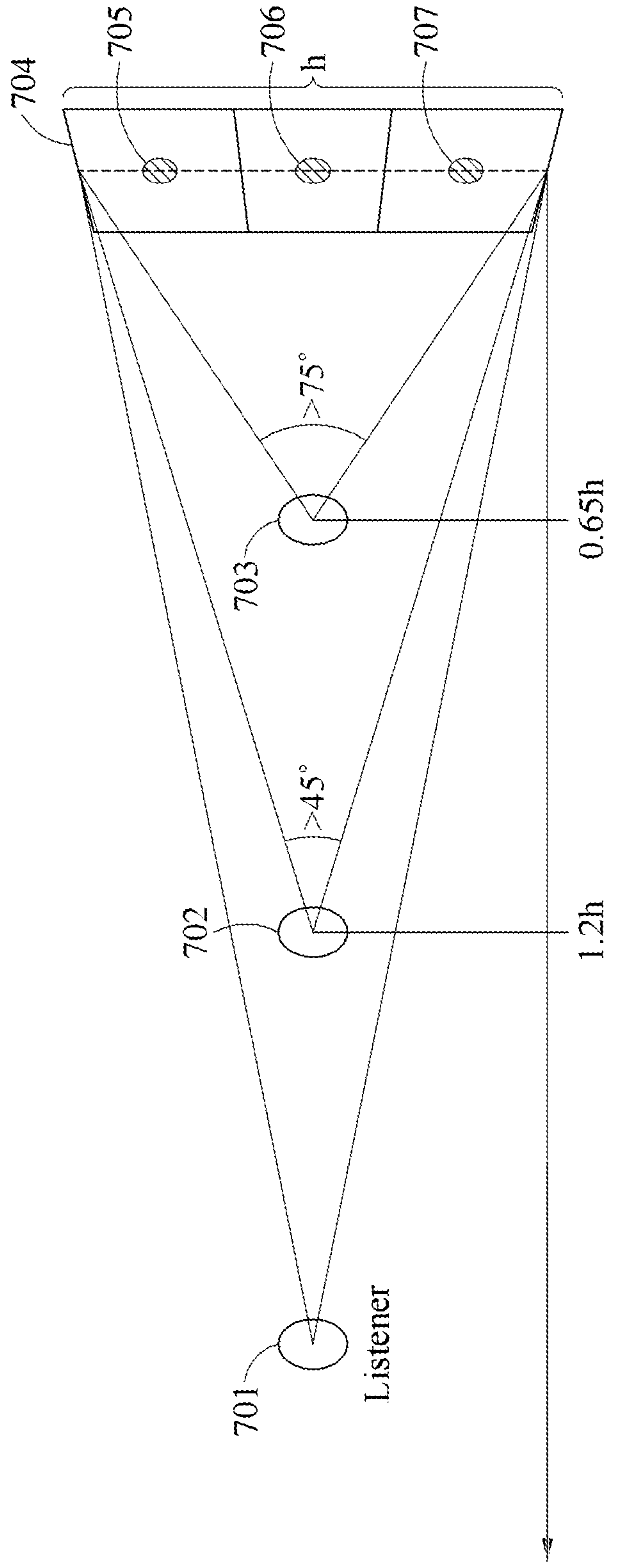
FIG. 7 is a diagram illustrating an example in which the number of sound sources is determined differently according to an angle between a listener and a volume sound source according to an example embodiment.

FIG. 7 is a diagram illustrating an example in which the number of sound sources is determined differently according to an angle between the listener and the volume sound source according to an example embodiment.

Referring to FIG. 7, the angle between the listener 703 and the corresponding area 704 of the volume sound source is determined to be 75 degrees, and accordingly, three source elements 705-707 may be determined. Referring to FIG. 7, the angle between the listener 702 and the corresponding area 704 of the volume sound source is determined to be 45 degrees, and accordingly, two source elements may be determined. Referring to FIG. 7, the angle between the listener 701 and the corresponding area 704 of the volume sound source is determined to be less than 45 degrees, and accordingly, one source element may be determined.

FIG. 7 may be a case in which the maximum number of source elements 705-707 is determined to be three. The maximum number of source elements 705-707 may be predetermined based on a reference distance. For example, when the reference distance is 1 meter and the distance between the listener and the volume sound source is 1 meter or less, the maximum number of source elements 705-707 may be set to three (3).

When the total length of the corresponding area 704 is h, and if the angle between the listener 703 and the corresponding area 704 of the volume sound source is 75 degrees, the distance between the listener 703 and the corresponding area 704 is h/2*tan(75/2) (about 0.65 h).

When the total length of the corresponding area 704 is h, and if the angle between the listener 702 and the corresponding area 704 of the volume sound source is 45 degrees, the distance between the listener 702 and the corresponding area 704 is h/2*tan(45/2) (about 1.2 h).

Figure 8:
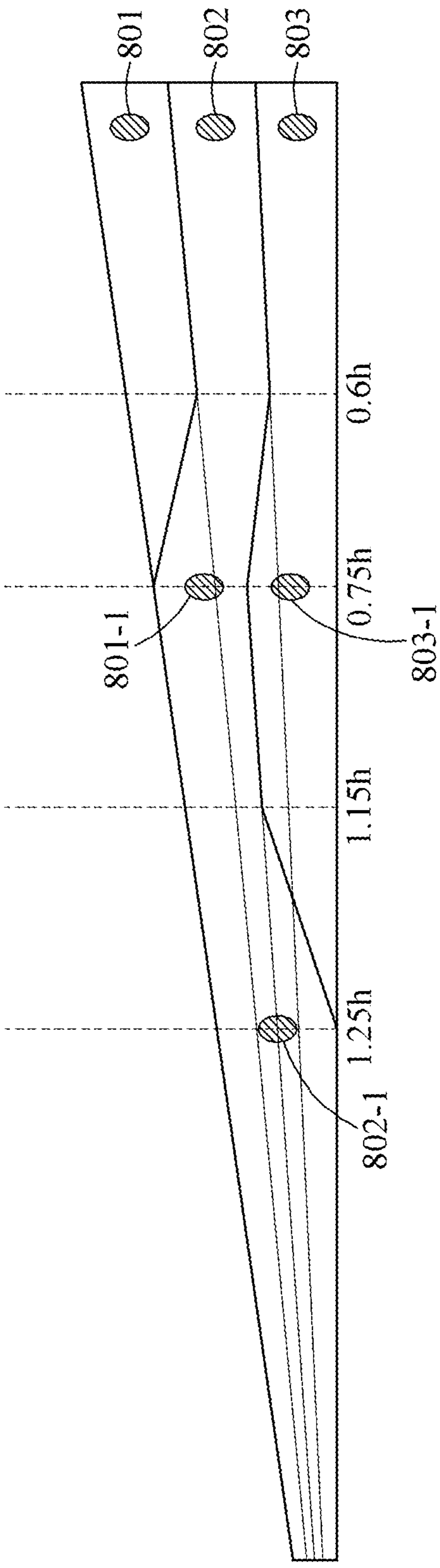
FIG. 8 is a diagram illustrating overlap between sound sources determined according to an example embodiment.

FIG. 8 is a diagram illustrating overlap between source elements determined according to an example embodiment.

The rendering apparatus may determine the gains of the source elements 801-803 with the same weight. However, if the listener moves, as the angle between the listener and the corresponding area of the volume sound source changes, the number of source elements 801-803 may be changed during sound signal output. In the case of a point where the number of source elements 801-803 is changed, noise may occur.

The rendering apparatus may cause the number of sound sources to gradually change using an overlap and add operation at a position where the number of source elements 801-803 is changed.

For example, if moving from the position of the listener 703 in FIG. 7 to the corresponding area direction, three source elements 801-803 are rendered, but if moving in the opposite direction, two source elements 801-803 may be rendered. To prevent this, the rendering apparatus may determine the gain differently for each source element 801-803 at a point where the number of source elements 801-803 is changed.

As an example, if the listener is located in the section (0.6 h~0.7 h) in which the number of the source element of FIG. 7 is changed from three to two, the gain of the source element 801-803 may be determined according to Equations 1-3, respectively.

$$g1=((0.7h-di)/0.1h)/3 \quad \text{[Equation 1]}$$

$$g2=((1/3-g1)/2+1/3 \quad \text{[Equation 2]}$$

$$g3=((1/3-g1)/2+1/3 \quad \text{[Equation 3]}$$

In Equation 1-3, di may mean the distance between the listener and the corresponding area. h may mean the total length of the corresponding area. g1 may mean the gain of the source element 801, g2 may mean the gain of the source element 802, and g3 may mean the gain of the source element 803.

In other words, if the listener is located in the section (0.6 h~0.7 h) in which the number of the source element of FIG. 7 is changed from three to two, the gain of the source element 801 may be attenuated to 0. The rendering apparatus may determine the gain of the source elements 801-803 by adding a portion of the attenuated gain (for example, g1) of the source element 801 to the remaining source elements 802, 803.

For example, the rendering apparatus may determine the gain of the source elements 801-803 by adding the value of attenuated gain (for example, g1) of the source element 801 divided by the number of the remaining source elements (for example, two (2) if the section (0.6 h~0.7 h) in which the number of the source element is changed from three to two) to the remaining source elements 802, 803.

For example, if the listener is located in the section (1.15 h~1.25 h) in which the number of the source element of FIG. 7 is changed from two to one, the gain of the source element 801-803 may be determined according to Equations 4-6, respectively.

For the section of 1.15 h~1.25 h distance in FIG. 7:

$$g1=0 \quad \text{[Equation 4]}$$

$$g2=(1/2-g3)+1/2 \quad \text{[Equation 5]}$$

$$g3=((1.25h-di)/0.1h)/2 \quad \text{[Equation 6]}$$

In Equation 4-6, di may mean the distance between the listener and the corresponding area. h may mean the total length of the corresponding area. g1 may mean the gain of the source element 801, g2 may mean the gain of the source element 802, and g3 may mean the gain of the source element 803.

Figure 9:
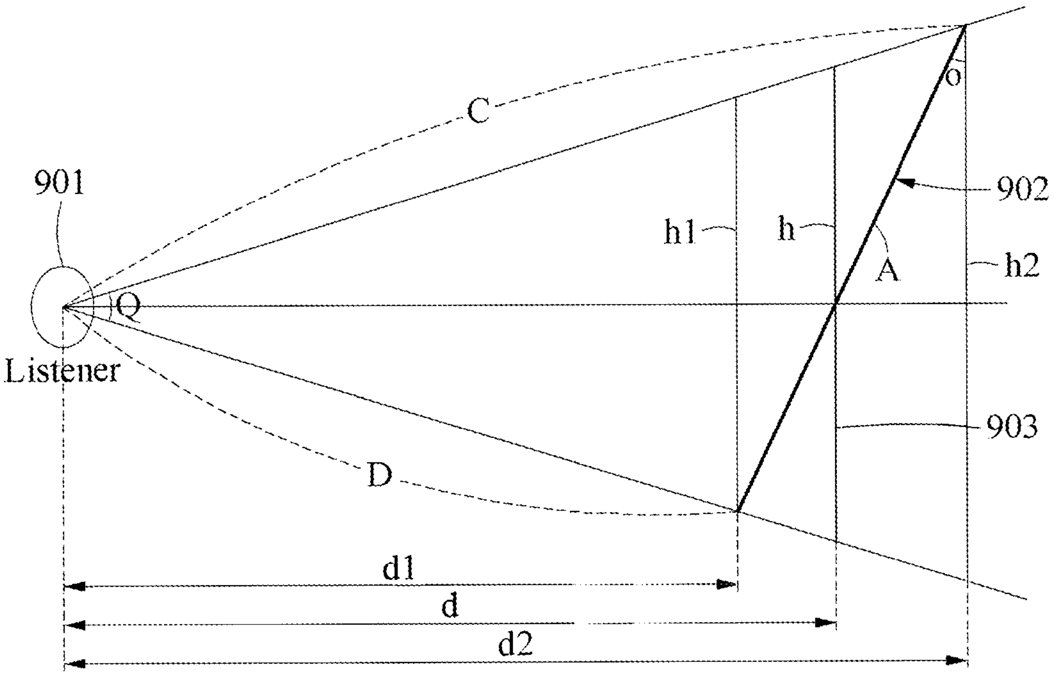
FIG. 9 is a diagram illustrating a positional relationship between a cross section of a volume sound source and a listener corresponding to a direction of a listener according to an example embodiment.

FIG. 9 is a diagram illustrating a positional relationship between a cross section of a volume sound source corresponding to a direction of a listener and a listener according to an example embodiment.

Depending on situations, the corresponding area 902 (A) of the volume sound source according to the position of the listener 901 may not be symmetrical. As an example, the distance (d) between the listener 901 and the corresponding region 902 may be determined using Equation 7-12 below.

$$Q=\cos^{-1}((C^2+D^2-A^2)/2*C*D) \quad \text{[Equation 7]}$$

$$h2=2*\sin(Q/2)/C \quad \text{[Equation 8]}$$

$$d2=\cos(Q/2)*C \quad \text{[Equation 9]}$$

$$o=\cos^{-1}((A^2+h2^2-(C-D)^2)/2*A*h2) \quad \text{[Equation 10]}$$

$$d=d2-\tan(o)*(h2/2) \quad \text{[Equation 11]}$$

$$h=2*\tan(Q/2)*d \quad \text{[Equation 12]}$$

Q may mean the angle between the listener 901 and the corresponding area 902 (A) in FIG. 7. A may mean the total length of the corresponding area 902 in FIG. 7, and C and D may be distances between the listener 901 and the boundary of the corresponding area 902. o may mean an angle between the corresponding area 902 and h2. d1 and d2 may mean a horizontal distance between the boundary between the listener 901 and the corresponding area 902.

The values of the angle Q, h2 and d2 determined by the listener 901 and endpoints of the volume sound source may be calculated from the values of A, C, and D. If the angle o is calculated according to Equation 10, d and h may be determined. The rendering apparatus may render the sound signal of the volume sound source based on d and h.

For example, the rendering apparatus may dispose the sound source signal by dividing the line segment h by the number of source elements. In addition, the rendering apparatus may derive a result similar to that rendered in the corresponding area 902 (A) by determining the weight of the gain according to the distance differently.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, for example, in a machine-readable storage device (for example, a computer-readable medium) or in a propagated signal for processing by, or to control an operation of a data processing apparatus, for example, a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, for example, magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

Also, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A rendering method of rendering a volume sound source, the rendering method comprising:
identifying information about a listener and information about the volume sound source;
determining a corresponding area in which a source element is disposed in the volume sound source in consideration of the information about the listener;
determining an angle between the listener and the corresponding area based on the information about the listener and the information about the volume sound source;
determining a number of source elements disposed in the corresponding area according to the angle;
determining a position and a gain of the source element using i) the number of source elements and ii) a distance between the listener and the volume sound source; and
rendering the volume sound source according to the position and the gain of the source element.

2. The rendering method of claim 1, further comprising:
determining a maximum number of the source elements based on the information about the volume sound source.

3. The rendering method of claim 2, wherein determining of the maximum number of the source elements comprises determining the maximum number of the source elements and sound source locations in which the source elements are disposed in the volume sound source using a size and shape of the volume sound source.

4. The rendering method of claim 1, wherein the information about the listener comprises at least one of a position and a direction of the listener.

5. The rendering method of claim 1, wherein the information about the volume sound source comprises at least one of a location, a size, and a shape of the volume sound source.

6. The rendering method of claim 1, further comprising:
identifying a sound signal of the volume sound source; and
mixing (channel number conversion) the sound signal in case a number of channels of the sound signal is different from the determined number.

7. The rendering method of claim 6, wherein the mixing of the sound signal comprises:
up-mixing the sound signal in case the determined number is greater than the number of channels of the sound signal; and
down-mixing the sound signal in case the determined number is smaller than the number of channels of the sound signal.

8. The rendering method of claim 1 further comprising:
determining a contour of the corresponding area,
wherein determining of the angle comprises determining an angle between the listener and the corresponding area in consideration of the contour of the corresponding area and the position of the listener.

9. The rendering method of claim 1, wherein determining of the corresponding area comprises determining the corresponding area according to a boundary contacting to the position of the listener.

10. A rendering apparatus for rendering a volume sound source, the rendering apparatus comprising:
a processor configured to identify information about a listener and information about the volume sound source, determine a corresponding area in which a source element is disposed in the volume sound source in consideration of the information about the listener, determine an angle between the listener and the corresponding area in consideration of the information about the listener and the information about the volume sound source, determine a number of the source elements disposed in the corresponding area according to the angle, determine a position and a gain of the source element using i) the number of the source elements and ii) a distance between the listener and the volume sound source, and render the volume sound source according to the position and the gain of the source element.

11. The rendering apparatus of claim 10, wherein the processor is configured to determine a maximum number of the source elements based on the information about the volume sound source.

12. The rendering apparatus of claim 11, wherein the processor is further configured to determine the maximum number of the source elements and sound source locations in which the source elements are disposed in the volume sound source using a size and shape of the volume sound source.

13. The rendering apparatus of claim 10, wherein the information about the volume sound source comprises at least one of a location, a size, and a shape of the volume sound source.

14. The rendering apparatus of claim 10, wherein the processor is configured to identify a sound signal of the volume sound source, and mix the sound signal in case a number of channels of the sound signal is different from the determined number.

15. The rendering apparatus of claim 14, wherein the processor is further configured to up-mix the sound signal in case the determined number is greater than the number of channels of the sound signal, and down-mix the sound signal in case the determined number is smaller than the number of channels of the sound signal.

16. The rendering apparatus of claim 10, wherein the processor is configured to determine a contour of the corresponding area, and determine an angle between the listener and the corresponding area in consideration of the contour of the corresponding area and the position of the listener.

17. The rendering apparatus of claim 10, wherein the processor is configured to determine the corresponding area according to a boundary contacting to the position of the listener.

* * * * *